(No Model.)  2 Sheets—Sheet 1.

J. M. TAFT.
VELOCIPEDE.

No. 549,695.  Patented Nov. 12, 1895.

Witnesses:
Fred Julach
Alberta Adamick.

Inventor:
J. M. Taft
By Peirce & Fisher
Attorneys.

(No Model.) 2 Sheets—Sheet 2.
J. M. TAFT.
VELOCIPEDE.
No. 549,695. Patented Nov. 12, 1895.
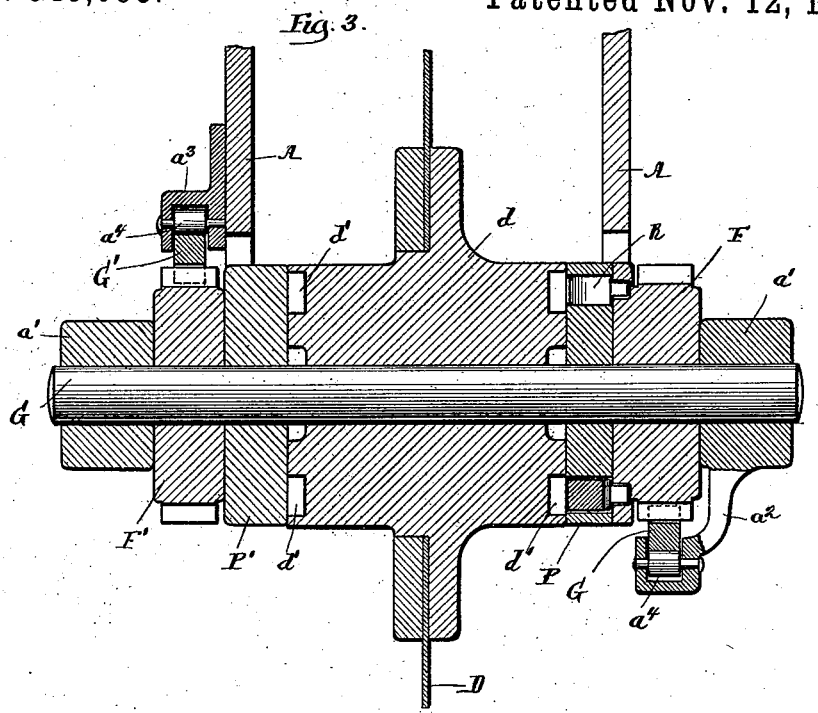
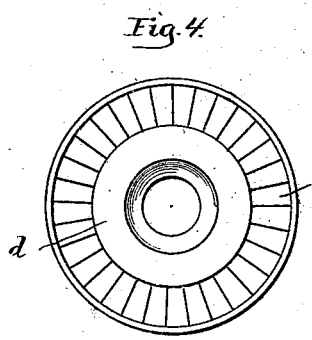
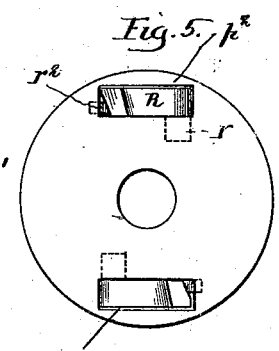
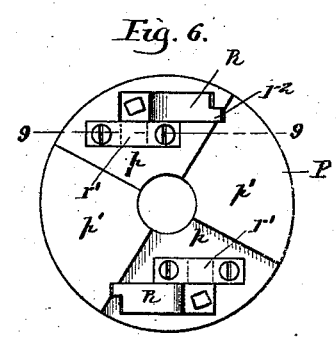
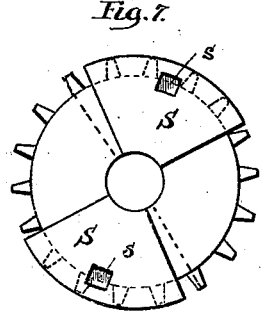
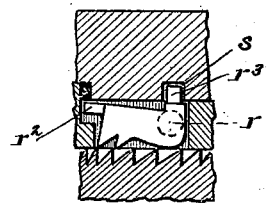
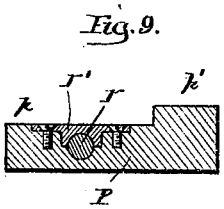
Witnesses:
Fred Gerlach
Alberta Adamick
Inventor:
J. M. Taft
By Prince & Fisher
Attorneys.

UNITED STATES PATENT OFFICE.

JAMES M. TAFT, OF SOUTH HEART, NORTH DAKOTA, ASSIGNOR OF ONE-HALF TO FREDERICK A. INGALLS, OF ST. PAUL, MINNESOTA.

VELOCIPEDE.

SPECIFICATION forming part of Letters Patent No. 549,695, dated November 12, 1895.

Application filed May 3, 1895. Serial No. 548,018. (No model.)

*To all whom it may concern:*

Be it known that I, JAMES M. TAFT, a citizen of the United States, residing at South Heart, North Dakota, have invented certain new and useful Improvements in Velocipedes, of which I do declare the following to be a full, clear, and exact description, reference being had to the accompanying drawings, forming a part of this specification.

The present invention has relation more particularly to that class of velocipedes designed to travel upon railway-rails and now commonly known as "railway-velocipedes," and the object of the invention is to provide improved mechanism for driving the machine.

The invention consists in the various novel features of construction and combination of parts hereinafter described, illustrated in the accompanying drawings, and particularly set out in the claims at the end of this specification.

Figure 1:
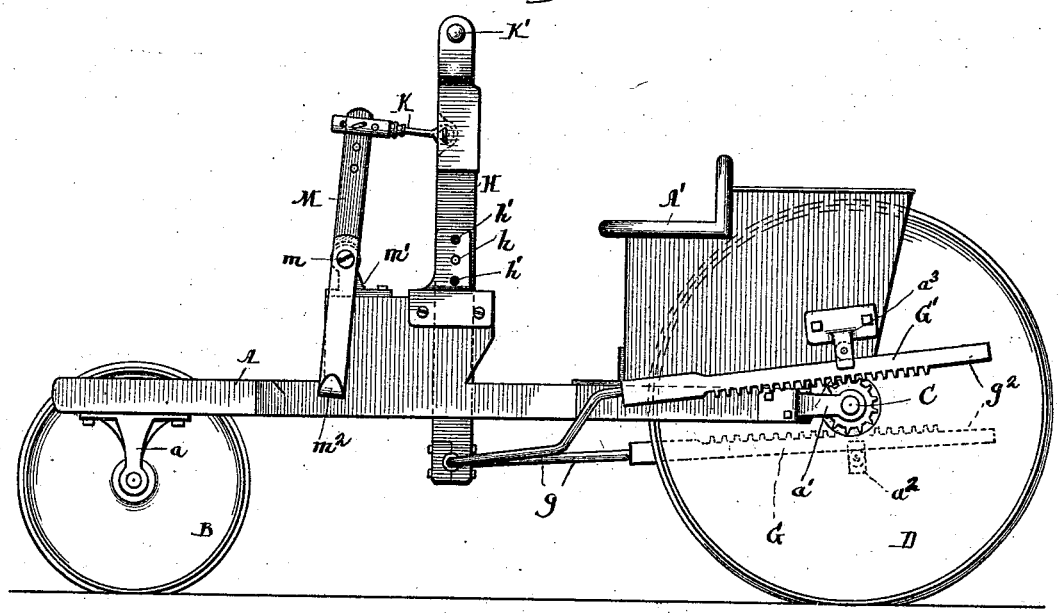
Figure 2:
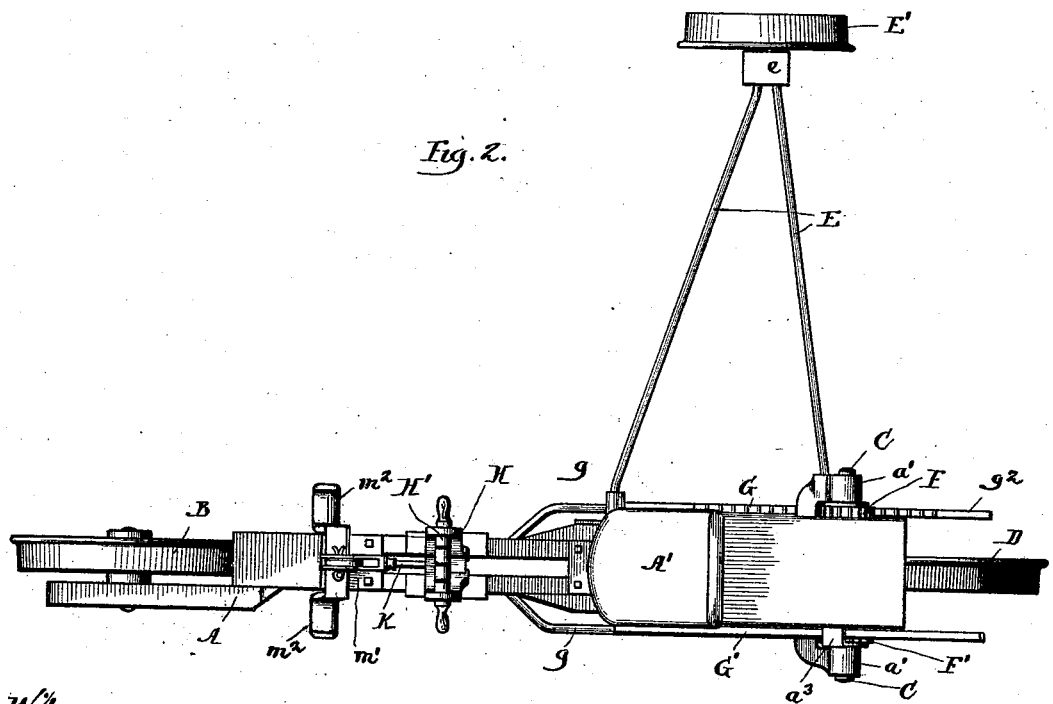

Figure 1 is a side view of a railway-velocipede embodying my invention. Fig. 2 is a plan view. Fig. 3 is a view in longitudinal section through the hub of the driving-wheel and adjacent parts. Fig. 4 is a view of one end of the hub of the driving-wheel. Fig. 5 is an inner face view of the section of the clutch member adjacent each end of the driving-wheel hub. Fig. 6 is an outer face view of the clutch member shown in Fig. 5. Fig. 7 is an inner face view of a gear-wheel that is located adjacent to and outside the clutch member shown in Figs. 5 and 6. Fig. 8 is a detail view in section through a portion of the driving-wheel hub, through the clutch member adjacent thereto, and through the gear-wheel outside the clutch member, one of the pawls carried by the clutch member being shown in elevation. Fig. 9 is a view in cross-section on line 9 9 of Fig. 6.

A designates the main frame of the machine, this frame being provided at its front with a bracket $a$ or other suitable means for connection with the forward wheel B and being provided at its rear with suitable brackets $a'$, wherein is journaled the axle C of the driving-wheel D. To one side of the main frame A are suitably connected the rods E, that carry at their outer ends a bearing $e$ for the guide-wheel E'. The main frame A is furnished, also, with an operator's seat A', that is conveniently supported in any suitable manner by the main frame.

Upon the axle C of the main drive-wheel D and outside the hub $d$ of the drive-wheel are mounted the gear-wheels F and F', and with these gear-wheels engage the teeth of the rack-bars G and G', these rack-bars being held in engagement with the gear-wheels F and F' by suitable brackets $a^2$ and $a^3$. The bracket $a^2$ is shown as depending from the bracket-bearing $a'$ of the drive-wheel axle C, while the bracket $a^3$ is shown as attached to a part of the main frame, and each of these brackets $a^2$ and $a^3$ are preferably furnished with a friction-roller $a^4$ to avoid wear upon the rack-bars G and G'.

The forward ends of the rack-bars G and G' are suitably connected, as by the bent rods $g$, with the lower end of an operating-lever H, that extends through the main frame A and is pivotally sustained thereby, as at $h$. The upper end of the operating-lever H is provided with the cross-bar H', the laterally-projecting ends of which serve as handles to be grasped by the operator. To the upper part of the operating-lever H is connected a link K, the opposite end of this link being adjustably united to the upper end of the treadle-lever M, that is pivotally sustained, as at $m$, upon a bracket $m'$, rising from the top of the main frame, and the lower yoke-shaped portion of the treadle-lever M is furnished with foot-plates $m^2$ to receive the feet of the operator.

Any suitable form of adjustable connection may be employed between the link K and the treadle-lever M, the pin-and-hole connection shown being one simple means for adjustably uniting these parts, and similar adjustable connection may be provided for the operating-lever H, since it is obvious that by shifting the pivot-pin $h$ into either of the holes $h'$ of the lever-sustaining bracket the throw of the lever may be modified to suit the operator.

From the construction of parts as thus far defined it will be seen that the operator upon the seat A' can with his hands or feet, or both, cause the rack-bars G and G' to reciprocate, and this reciprocating movement of the rack-bars will cause a corresponding revolution of the gear-wheels F and F'.

In order to impart movement from the gear-wheels F and F' to the drive-wheel D, I prefer to employ the mechanism next to be described.

Upon the drive-wheel axle C and between the hub $d$ of the drive-wheel and the gear-wheels F and F' are mounted the clutch members P and P', one of these clutch members being placed adjacent each of the gear-wheels F and F'. Each of the clutch members P is shown as consisting of an annular plate, the inner face of which is flat, while its outer face is formed with segmental recesses $p$ and the segmental raised portions $p'$. (See Figs. 6 and 9.) Each of the clutch members P and P' is formed with one or more slots $p^2$ in which are pivoted the pawls R. I have shown these pawls R as formed with pivot-studs $r$, that are held in place by plates $r'$, attached to the clutch members P and P', although manifestly any other convenient means might be employed for connecting the pawls with the clutch members. Each of the pawls R (see Fig. 8) is shown, also, with inwardly-projecting teeth (one or more) adapted to engage the annular ratchet-teeth $d'$, that are formed upon the ends of the drive-wheel hub $d$. A projecting lug $r^2$ at the end of each pawl R serves to determine the extent of its movement.

Each of the pawls R is provided with a release-arm $r^3$, that enters a seat $s$, that is formed in the segmental raised portions S upon the inner sides of the gear-wheels F and F'. The segmental raised portions S of these gear-wheels set within the depressed portions $p$ of the adjacent clutch members P; but the raised portions F are somewhat narrower than the depressed portions $p$, and consequently there is a limited degree of play or lost motion between the gear-wheels and the clutch members. My purpose in providing this lost motion between these parts is to insure that the pawls R shall be automatically thrown out of engagement with the ratchet-teeth $d'$, thereby avoiding all wear upon the pawls and the teeth and yet insuring a firm locking of the parts as the gear-wheels are revolved in direction to cause the forward movement of the drive-wheel D. Thus it will be seen that as the operator works the operating-lever back and forth the rack-bars G and G' will be correspondingly shifted and these rack-bars will alternately cause the forward revolution of the gear-wheels F and F', since one of the rack-bars is arranged above and the other below the center of revolution of the gear-wheels. The initial strain upon the gear-wheels F and F' will cause a slight shift of their raised portions S either in forward or backward direction within the depressed portion $p$ of the clutch members P and P', and by reason of the engagement of the raised portions S with the projecting arms $r^3$ the dogs R will be rocked about their pivots, thereby causing their toothed ends to engage or disengage the annular ratchet-teeth $d'$ on the ends of the drive-wheel hub. Hence as the rack-bars G and G' are moved in backward direction one of the gear-wheels F will, through the clutch member P and its pawl R, impart revolution to the drive-wheel D, while the opposite gear-wheel F' will be disconnected from the drive-wheel. On the return or forward stroke of the rack-bars G and G' the initial forward strain upon the gear-wheels F and F' will first cause the raised portions S to rock the pawls R about their pivot-points, so that the wheel F' shall be engaged with the drive-wheel hub and the gear-wheel F shall be disengaged therefrom. In other words, during the idle strokes of the rack-bars their corresponding gear-wheels are disengaged from the drive-wheel hub and the pawls are held clear from the ratchet-teeth, thus avoiding all wear thereon.

The construction permits the operator to use as short a stroke as he may desire, since there is no dead-center in the operation, and when the machine is moving in forward direction the operating-lever may be arrested entirely By preference the rear ends of the rack-bars G and G' are formed with the untoothed portions $g^2$, that can be brought above the gear-wheels F and F' when the operating-lever H has its upper end drawn backwardly to its extreme position, and when the portions $g^2$ of the rack-bars are thus above the gear-wheels F and F' the machine can be moved backward as well as forward.

Having thus described the invention, what I claim as new, and desire to secure by Letters Patent, is—

1. In a velocipede the combination with the drive wheel and its shaft, of gear wheels mounted upon said shaft at each side of the drive wheel hub, and clutch members interposed between said gear wheels and said drive wheel hub, rack bars engaging with the gear wheels at opposite sides of the drive wheel and an operating lever connected to said rack bars, substantially as described.

2. In a velocipede the combination with a main frame of an operating lever adjustably mounted upon said main frame and a pivoted treadle lever having its upper end adjustably connected to said operating lever, a drive wheel and suitable means for transmitting motion from said operating lever to said drive wheel, substantially as described.

3. In a velocipede the combination with the main frame and its drive wheel, of gear wheels mounted upon the drive wheel shaft, clutch mechanism for effecting the engagement of said gear wheels with the drive wheel, and rack bars meshing with said gear wheels, said rack bars having untoothed portions adapted to be brought opposite the gear wheels in order to permit the drive wheel to be moved in backward direction, substantially as described.

4. In a velocipede the combination with the main frame, and the operating lever, of the rack bars connected to said operating lever, the gear wheels engaging said rack bars, the drive wheel upon the shaft of which said gear wheels are mounted, suitable clutches for effecting the engagement of said gear wheels with said drive wheel and suitable guide brackets for retaining said rack bars in engagement with the gear wheels, substantially as described.

5. In a velocipede the combination with the drive wheel and its shaft, of gear wheels mounted upon said shaft at opposite sides of said drive wheel and clutch members interposed between said gear wheels and the hub of the drive wheel, said clutch members being provided with pawls to engage ratchet teeth at each end of the drive wheel hub, substantially as described.

6. In a velocipede the combination with the drive wheel, the hub of which is provided with annular ratchet teeth at its opposite ends, of pawl-carrying clutch members mounted upon the drive wheel shaft adjacent its hub and gear wheels provided with means for throwing the said pawls of the clutch members into and out of engagement with the ratchet teeth, substantially as described.

7. In a velocipede the combination with the drive wheel having a hub provided with ratchet teeth at its opposite ends, of clutch members mounted upon the drive wheel shaft and provided with pawls for engaging said ratchet teeth, said pawls having extensions at their backs, gear wheels mounted upon the drive wheel shaft and engaging the pawl extensions, rack bars for driving said gear wheels and an operating lever connected to said rack bars, substantially as described.

8. In a velocipede the combination with the drive wheel hub having ratchet teeth at its opposite ends, of clutch members provided with pivotal pawls for engaging said teeth, said pawls having extensions, gear wheels engaging the extensions of said pawls and united by a lost motion connection with said clutch members, rack bars for driving said gear wheels and an operating lever connected to said rack bars, substantially as described.

9. In a velocipede the combination with the drive wheel hub having ratchet teeth at its ends, of clutch members mounted upon the drive wheel shaft and provided with slots, pawls pivotally mounted within said slots and provided with extensions, gear wheels mounted upon said drive wheel shaft and engaging said extensions of the pawls to throw said pawls into and out of engagement with the ratchet teeth, rack bars meshing with said gear wheels and an operating lever connected to said rack bars, substantially as described.

JAMES M. TAFT.

Witnesses:
GUY J. D. FRANCE,
DAN H. CHRISTIE.